(12) United States Patent
Foley

(10) Patent No.: US 9,924,217 B1
(45) Date of Patent: Mar. 20, 2018

(54) HOME SCREEN RECOMMENDATIONS DETERMINATION

(71) Applicant: ECHOSTAR TECHNOLOGIES L.L.C., Englewood, CO (US)

(72) Inventor: Vernon Foley, Butte, MT (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 15/359,457

(22) Filed: Nov. 22, 2016

(51) Int. Cl.
H04N 21/442 (2011.01)
H04N 21/422 (2011.01)
H04N 21/466 (2011.01)

(52) U.S. Cl.
CPC . *H04N 21/42204* (2013.01); *H04N 21/44222* (2013.01); *H04N 21/4667* (2013.01)

(58) Field of Classification Search
CPC .................................................. H04N 21/442
See application file for complete search history.

(56) References Cited

U.S. PATENT DOCUMENTS

| | | | |
|---|---|---|---|
| 6,769,127 | B1 | 7/2004 | Bonomi et al. |
| 7,877,765 | B2 | 1/2011 | Bhogal et al. |
| 7,912,824 | B2 | 3/2011 | Anguiano |
| 7,954,120 | B2 | 5/2011 | Roberts et al. |
| 8,132,205 | B2 | 3/2012 | VanDuyn et al. |
| 2002/0174429 | A1 | 11/2002 | Gutta et al. |
| 2003/0061239 | A1 | 3/2003 | Yoon |
| 2003/0084448 | A1 | 5/2003 | Soundararajan |
| 2003/0217365 | A1 | 11/2003 | Caputo |
| 2003/0220100 | A1 | 11/2003 | McElhatten et al. |
| 2004/0078823 | A1 | 4/2004 | Schlarb et al. |
| 2004/0261096 | A1 | 12/2004 | Matz |

(Continued)

FOREIGN PATENT DOCUMENTS

| | | |
|---|---|---|
| EP | 2 768 233 A1 | 8/2014 |
| GB | 2476136 A | 6/2011 |

(Continued)

OTHER PUBLICATIONS

"Bayes classifier," URL=https://en.wikipedia.org/w/index.php?title=Bayes_classifier&oldid=634296384, download date Feb. 24, 2017, 2 pages.

(Continued)

*Primary Examiner* — Hunter B Lonsberry
(74) *Attorney, Agent, or Firm* — Seed Intellectual Property Law Group LLP

(57) ABSTRACT

A method for recommending audiovisual content includes receiving a signal transmitted by a remote control device at a content receiving device. Position information of the remote control device is obtained based on the signal transmitted by the remote control device. The position information can include a distance between the remote control device and the content receiving device, a direction of the remote control device with respect to the content receiving device, and coordinates of the remote control device. Viewing habits are obtained based on the position information of the remote control device. An audiovisual program is selected based on the viewing habits. The audiovisual program is recommended to a user by outputting data indicating the selected audiovisual program from the content receiving device.

20 Claims, 9 Drawing Sheets

(56) References Cited

U.S. PATENT DOCUMENTS

| | | |
|---|---|---|
| 2005/0028208 A1 | 2/2005 | Ellis et al. |
| 2005/0120369 A1 | 6/2005 | Matz |
| 2005/0149964 A1 | 7/2005 | Thomas et al. |
| 2005/0160461 A1 | 7/2005 | Baumgartner et al. |
| 2005/0210530 A1 | 9/2005 | Horvitz et al. |
| 2005/0246738 A1 | 11/2005 | Lockett et al. |
| 2006/0129547 A1 | 6/2006 | Yamamoto et al. |
| 2006/0184967 A1 | 8/2006 | Maynard et al. |
| 2007/0033607 A1 | 2/2007 | Bryan |
| 2007/0154163 A1 | 7/2007 | Cordray |
| 2007/0192796 A1 | 8/2007 | Iwabuchi et al. |
| 2007/0244747 A1 | 10/2007 | Nikovski |
| 2008/0059884 A1 | 3/2008 | Ellis et al. |
| 2008/0184297 A1 | 7/2008 | Ellis et al. |
| 2008/0278635 A1* | 11/2008 | Hardacker ......... H04N 5/44582 348/734 |
| 2009/0019488 A1 | 1/2009 | Ruiz-Velasco et al. |
| 2009/0077589 A1 | 3/2009 | Boyer et al. |
| 2009/0100463 A1 | 4/2009 | St John-Larkin |
| 2009/0133081 A1 | 5/2009 | Sakai et al. |
| 2009/0259518 A1 | 10/2009 | Harvey et al. |
| 2010/0192172 A1 | 7/2010 | Thomas et al. |
| 2010/0251304 A1 | 9/2010 | Donoghue et al. |
| 2011/0211813 A1 | 9/2011 | Marks |
| 2011/0214147 A1 | 9/2011 | Kashyap et al. |
| 2012/0117017 A1 | 5/2012 | Phillips et al. |
| 2012/0331494 A1 | 12/2012 | Pontual et al. |
| 2013/0035086 A1 | 2/2013 | Chardon et al. |
| 2013/0097623 A1 | 4/2013 | Lai et al. |
| 2013/0212615 A1* | 8/2013 | Schultz ............... H04L 12/2812 725/25 |
| 2013/0238544 A1 | 9/2013 | Kunjithapatham et al. |
| 2014/0089953 A1 | 3/2014 | Chen et al. |
| 2014/0189743 A1 | 7/2014 | Kennedy et al. |
| 2014/0282636 A1 | 9/2014 | Petander et al. |
| 2015/0143413 A1 | 5/2015 | Hall et al. |
| 2016/0037204 A1 | 2/2016 | McSweeney et al. |
| 2016/0088358 A1 | 3/2016 | Garcia Navarro |
| 2016/0142761 A1 | 5/2016 | Govinde |
| 2016/0212491 A1 | 7/2016 | Pangilinan et al. |
| 2017/0019267 A1* | 1/2017 | Togashi ............... H04L 12/2807 |

FOREIGN PATENT DOCUMENTS

| | | |
|---|---|---|
| JP | 11-220673 A | 8/1999 |
| JP | 2000-293539 A | 10/2000 |
| JP | 2001-223959 A | 8/2001 |
| JP | 2003-189333 A | 7/2003 |
| JP | 2003-284008 A | 10/2003 |
| JP | 2006-121252 A | 5/2006 |
| JP | 2009-21644 A | 1/2009 |
| KR | 10-2004-0102961 A | 12/2004 |
| WO | 02/25939 A2 | 3/2002 |

OTHER PUBLICATIONS

International Search Report and Written Opinion, dated Dec. 7, 2015, for International Application No. PCT/US2015/051269, 13 pages.

International Search Report and Written Opinion, dated May 9, 2016, for International Application No. PCT/US2016/013685, 11 pages.

"Markov decision process," URL=https://en.wikipedia.org/w/index.php?title=Markov_decision_process&direction=next&oldid=642250889, download date Feb. 24, 2017, 6 pages.

"Naive Bayes classifier," URL=https://en.wikipedia.org/w/index.php?title=Naive_Bayes_classifier&oldid=642043918, download date Feb. 24, 2017, 8 pages.

Sanchez et al., "User interest modeling for social TV-recommender systems based on audiovisual consumption," *Multimedia Systems* 19(6):493-507, 2013.

Su et al., "A Survey of Collaborative Filtering Techniques," *Advances in Artificial Intelligence 2009*:Article ID 421425, 2009. (19 pages).

\* cited by examiner

HOME SCREEN RECOMMENDATIONS DETERMINATION

BACKGROUND

Technical Field

The present disclosure relates to audiovisual content distribution and consumption and, in particular, to methods, devices, and systems that recommend audiovisual programs based on the position of a remote control device.

Description of the Related Art

Systems have been developed that provide a user with suggestions for audiovisual programs that are likely to be of interest to the user. For example, U.S. Patent Application Publication No. 2013/0035086 by Chardon et al. discloses a device that collects use information associated with controlling a set of home entertainment appliances, analyzes the use information to determine a set of content related to the use information, and generates a set of recommendations that includes information that identifies the set of content. The use information may include geographic information for a location at which the device is used. The geographic information may include a ZIP code, a street address, a town name, a specific geographic identifier for a broadcast region of a specific broadcaster, or location information determined from a global positioning system (GPS).

However, such a device is not able to recommend different sets of content based on different positions of the device within a room of a building, because GPS coordinates generally do not have the resolution to distinguish whether the device is in a first location or a second location that is less than one foot from the first location. For example, if a first user typically sits in a first chair and a second user typically sits in a second chair that next to the first chair while watching content in the living room of a house, GPS coordinates of the device would not be useful in distinguishing whether the device is being used by the first user or the second user and, thus, the device would not be able to recommend different sets of content to the first and second users based on the GPS coordinates of the device.

BRIEF SUMMARY

In one or more embodiments, a content receiving device obtains position information of a remote control device that is associated with the content receiving device. The content receiving device obtains the position information based on one or more signals that are received by the content receiving device. The position information can include a distance between the remote control device and the content receiving device, a direction of the remote control device with respect to the content receiving device, and coordinates of the remote control device. The position information may be used to modify presentation of an audiovisual program that is output from the content receiving device to a display device, such as a television. For example, the content receiving device may modify the volume and/or brightness level of the audiovisual program based on the distance between the remote control device and the content receiving device.

In one or more embodiments, the content receiving device uses the position information to identify a user who is operating the remote control device. The content receiving device may obtain viewing habit information for the identified user. The content receiving device may use the viewing habit information to select one or more audiovisual programs. The content receiving device may output data indicating the selected audiovisual programs to a display device, to recommend audiovisual content that is likely to be of interest to the identified user.

In one or more embodiments, the content receiving device includes a remote control interface that is configured to receive a signal transmitted by the remote control device. The content receiving device obtains the distance between the remote control device and the content receiving device based on a power level, a time, or a phase of the signal when it is received by the remote control interface.

In one or more embodiments, the content receiving device includes two remote control interfaces, each of which is configured to receive a signal from the remote control device. The content receiving device obtains the respective distances between the remote control device and the remote control interfaces, which the content receiving device uses to obtain the direction of the remote control device with respect to the content receiving device.

In one or more embodiments, the content receiving device includes three remote control interfaces, each of which is configured to receive a signal from the remote control device. The content receiving device obtains the respective distances between the remote control device and the remote control interfaces, which the content receiving device uses to obtain the coordinates of the remote control device.

In one or more embodiments, the content receiving device includes a network interface that is configured to receive a signal from another device, wherein the signal indicates a distance between the remote control device and the other device. The content receiving device obtains the distance between the remote control device and the content receiving device based on the signal received by the network interface.

In one or more embodiments, the content receiving device includes a remote control interface that is configured to receive a first signal from the remote control device, and a network interface that is configured to receive a second signal from a second device. The content receiving device obtains the direction of the remote control device with respect to the content receiving device based on the first signal and the second signal.

In one or more embodiments, the content receiving device includes a remote control interface that is configured to receive a first signal from the remote control device, and a network interface that is configured to receive a second signal from a second device and a third signal from a third device. The content receiving device obtains coordinates of the remote control device based on the first signal, the second signal, and the third signal.

DETAILED DESCRIPTION

Figure 1:
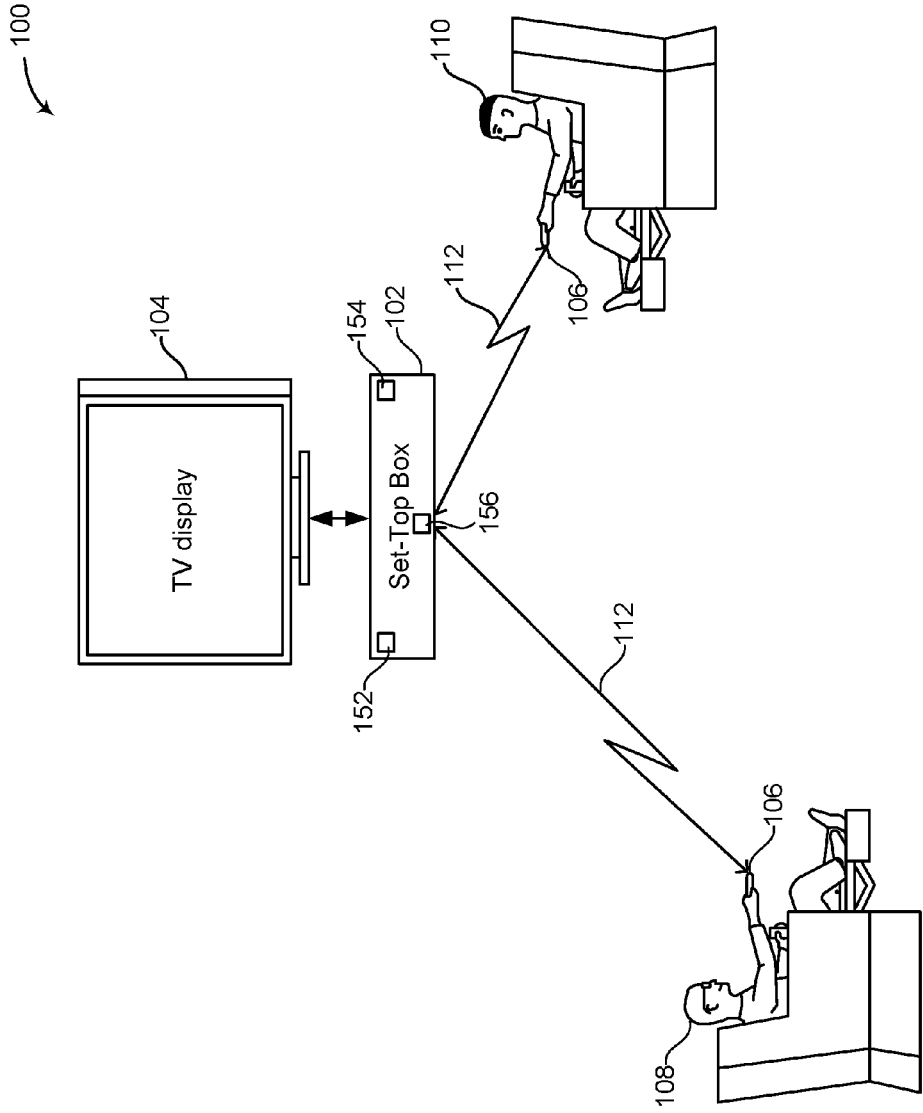
FIG. 1 illustrates a system according to one or more embodiments of the present disclosure.

FIG. 1 illustrates a system 100 according to one or more embodiments of the present disclosure. The system 100 includes a set-top box or content receiving device 102, a television display or display device 104, and a remote control device 106. The remote control device 106 transmits signals 112 to the content receiving device 102, which the content receiving device 102 uses to control the display device 104. For example, the remote control device 106 transmits the signals 112 to the content receiving device 102 to power on and off, change the volume level of, and change the channel displayed by the display device 104.

As will be explained in detail below, the content receiving device 102 uses the signals 112 transmitted by the remote control device 106 to obtain position information regarding the remote control device 106, which is used to recommend audiovisual content to users. The position information may include a distance from the remote control device 106 to the content receiving device 102, a direction of the remote control device 106 with respect to the content receiving device 102, and coordinates of the remote control device 106.

For example, a first user 108 may be a parent and a second user 110 may be the parent's child. If the first user 108 typically sits in a first chair that is a first distance from the content receiving device 102 while watching the display device 104, the content receiving device 102 may associate the first distance with an identifier of the first user 108. Additionally, if the second user 110 typically sits in a second chair that is a second distance from the content receiving device 102 while watching the display device 104, the content receiving device 102 may associate the second distance with an identifier of second user 110. Subsequently, if the content receiving device 102 determines, based on a signal 112 received by the content receiving device 102, that the remote control device 106 is approximately the first distance away from the content receiving device 102, the content receiving device 102 may cause a screen to be displayed by the display device 104, wherein the screen identifies at least one audiovisual program that the content receiving device 102 has determined is likely to be of interest to the first user 108.

Figure 2:
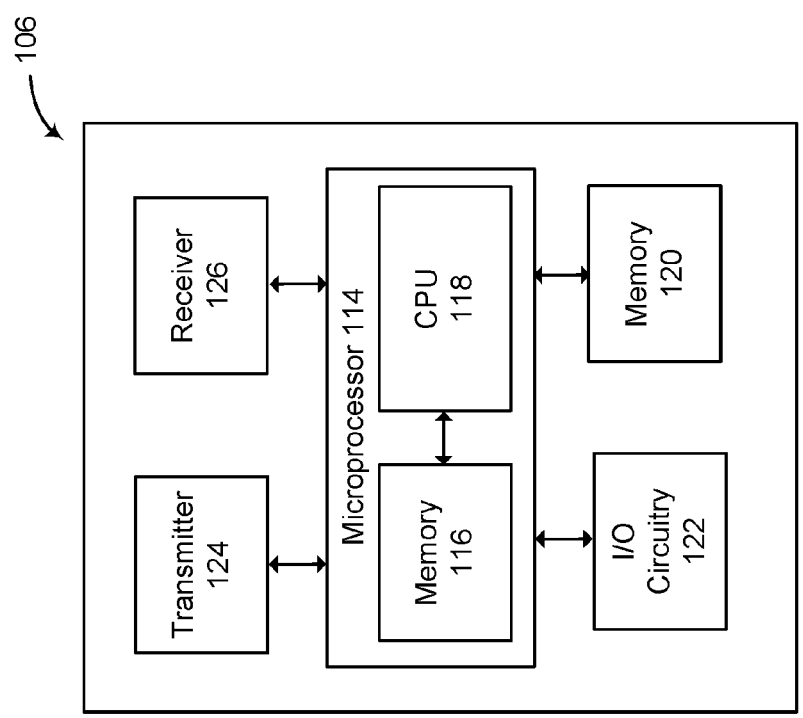
FIG. 2 illustrates a block diagram of a remote control device according to one or more embodiments of the present disclosure.

FIG. 2 illustrates a block diagram of the remote control device 106 according to one or more embodiments of the present disclosure. The remote control device 106 includes a microprocessor 114 having a memory 116 and a central processing unit (CPU) 118, a memory 120, input/output (I/O) circuitry 122, a transmitter 124. In one or more embodiments, the remote control device 106 also includes a receiver 126.

The memory 120 stores processor-executable instructions that, when executed by the CPU 118, cause the remote control device 102 to perform the functions described herein. The CPU 118 uses the memory 116 as a working memory while executing the instructions. In one or more embodiments, the memory 116 is comprised of one or more random access memory (RAM) modules. In one or more embodiments, the memory 120 is comprised of one or more non-volatile random access memory (NVRAM) modules, such as electronically erasable programmable read-only memory (EEPROM) or Flash memory modules, for example.

In one or more embodiments, the I/O circuitry 122 may include buttons, switches, dials, knobs, a touchscreen, or other user-interface elements for inputting commands to the remote control device 106. The I/O circuitry 122 also may include a speaker, one or more light emitting devices, or other user-interface elements for outputting information or indications from the remote control device 106.

In one or more embodiments, the transmitter 124 is configured to transmit infrared (IR) signals to the content receiving device 102. In one or more embodiments, the transmitter 124 is configured to transmit radio frequency (RF) signals to the content receiving device 102. In one or more embodiments, the transmitter 124 is configured to transmit both IR and RF signals to the content receiving device 102. The receiver 126 may be configured to receive IR signals and/or RF signals from the content receiving device 102.

Figure 3:
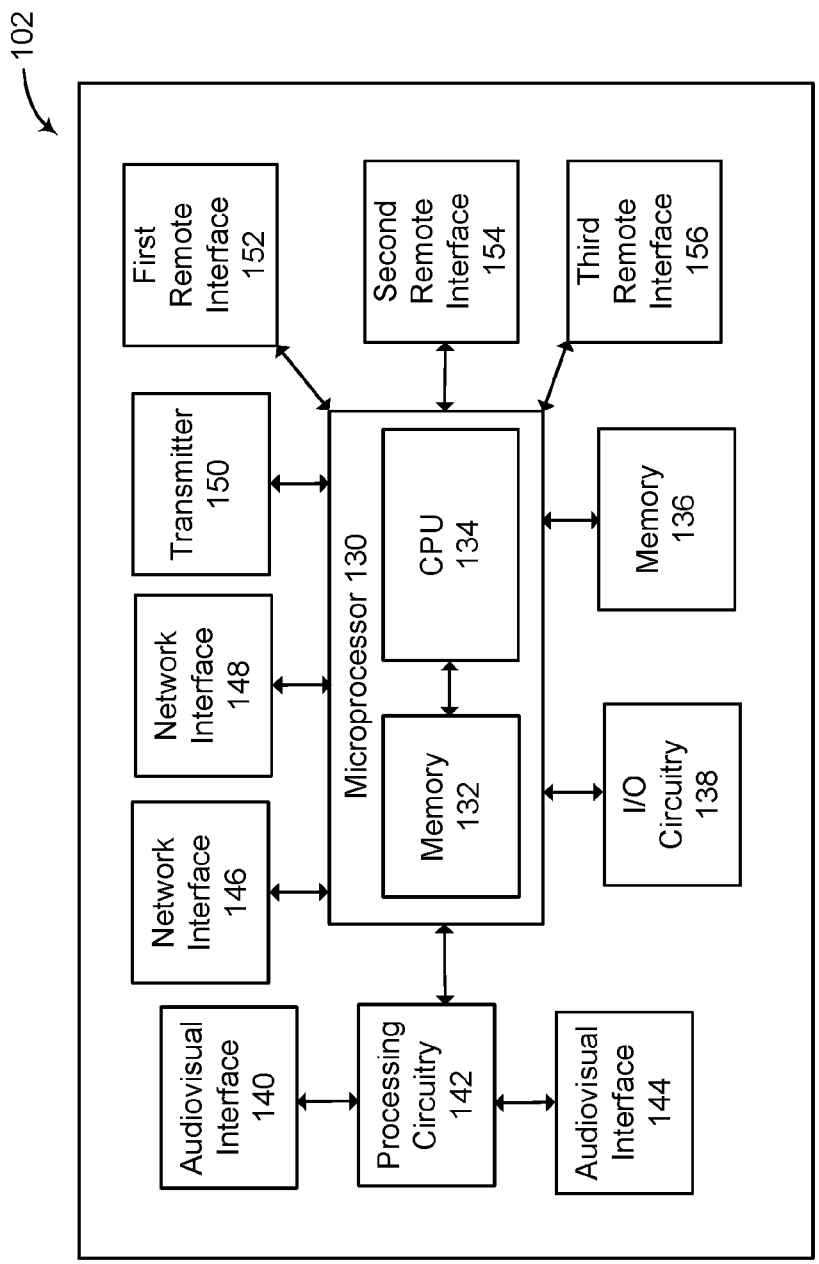
FIG. 3 illustrates a block diagram of a content receiving device according to one or more embodiments of the present disclosure.

FIG. 3 illustrates a block diagram of the content receiving device 102 according to one or more embodiments of the present disclosure. The content receiving device 102 includes a microprocessor 130 having a memory 132 and a CPU 134, a memory 136, I/O circuitry 138, a first audiovisual interface 140, processing circuitry 142, a second audiovisual interface 144, a first network interface 146, a second network interface 148, a transmitter 150, and a first remote control interface 152.

In one or more embodiments, the content receiving device 102 also includes a second remote control interface 154 and a third remote control interface 156. In one or more embodiments, the content receiving device 102 is arranged such that the first remote control interface 152, the second remote control interface 154, and the third remote control interface 156 are located as far apart from each other as practicable. For example, as shown in FIG. 1, the first remote control interface 152 may be located at an upper-left-front portion of a front panel of the content receiving device 102, the second remote control interface 154 may be located at an upper-right-rear portion of the front panel, and the third remote control interface 156 may be located at a lower-middle-middle portion of the front panel. If they are in the same housing, they will be spaced apart within that housing at locations to more easily distinguish the distance to the remote control device 106 with triangulation. If they are in a different housing, or a different receiving device 102, then one remote control interface 152 may be in a receiving device 102 located in an upstairs room, one remote control interface 154 may be in a receiving device 102 located in a downstairs room, and the other remote control interface 156 may be in a downstairs room that is in a diagonal location in the home from the upstairs room.

The memory 136 stores processor-executable instructions that, when executed by the CPU 134, cause the content receiving device 102 to perform the functions described herein. The CPU 134 uses the memory 132 as a working memory while executing the instructions. In one or more embodiments, the memory 132 is comprised of one or more RAM modules. In one or more embodiments, the memory 136 is comprised of one or more NVRAM modules, such as EEPROM or Flash memory modules, for example.

In one or more embodiments, the I/O circuitry 138 may include buttons, switches, dials, knobs, a touchscreen, or other user-interface elements for inputting commands to the content receiving device 102. The I/O circuitry 138 also may include a speaker, one or more light emitting devices, or other user-interface elements for outputting information or indications from content receiving device 102.

The first audiovisual interface 140 receives signals transmitted by a content provider, such as a cable-based content provider or a satellite-based content provider. In one or more embodiments, the processing circuitry 142 includes one or more amplifiers, analog-to-digital converters, digital-to-analog converts, modulator/demodulators (MODEMs), and video coder/decoders (CODECs), audio CODECs, which are used to process signals received at the first audiovisual interface 140. The processed signals are provided to the second audiovisual interface 144, which may be coupled to an audiovisual interface of the display device 104 by a cable, for example. Alternatively, the audiovisual interface 144 of the content receiving device 102 may be wirelessly coupled to the audiovisual interface of the display device 104.

The first network interface 146 is configured to transmit and receive signals over a wide-area network (WAN), such as the Internet. The first network interface 146 may be configured to receive audiovisual content and electronic program guide (EPG) data.

The second network interface 148 is configured to transmit and receive signals over a local area network (LAN). For example, the second network interface 148 may be configured to transmit and receive signals according to the Ethernet® standard. Additionally or alternatively, the second network interface 148 may be configured to transmit and receive signals according to one or more of the 802.11 wireless LAN standards.

In one or more embodiments, the content receiving device 102 includes the transmitter 150. The transmitter 150 may be configured to transmit IR signals and/or RF signals to the remote control device 106. For example, the transmitter 150 may be configured to transmit a first signal that, when received by the remote control device 106, causes the remote control device 106 to transmit a second signal that the content receiving device 102 uses to obtain position information regarding the remote control device 106, as will be explained below.

The first remote control interface 152 is configured to receive IR and/or RF signals transmitted by the remote control device 106. In one or more embodiments, the content receiving device 102 includes a second remote control interface 154 and/or a third remote control interface 156, each of which is configured to receive IR and/or RF signals transmitted by the remote control device 106.

Figure 4:
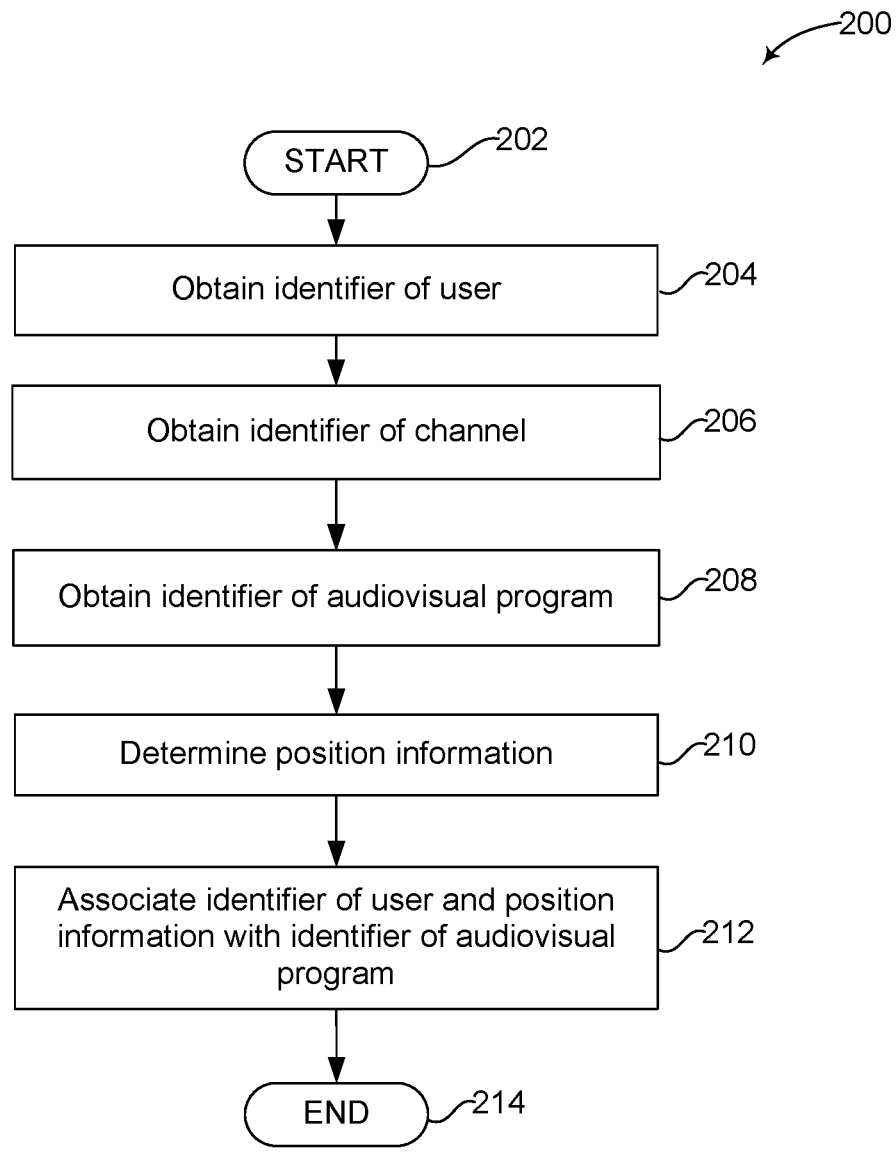
FIG. 4 illustrates a flowchart of a method according to one or more embodiments of the present disclosure.

FIG. 4 illustrates a flowchart of a method 200 according to one or more embodiments of the present disclosure. The method 200 begins at 202, for example, when a user pushes a button included in the I/O circuitry 122 of the remote control device 106, which is configured to cause a first signal 112 to be transmitted by the remote control device 106.

At 204, the content receiving device 102 obtains an identifier of a user. For example, the identifier of the user may be indicated by the first signal 112. The content receiving device 102 may obtain the identifier of the user by demodulating and decoding the first signal 112.

At 206, the content receiving device 102 obtains an identifier of a channel. For example, the content receiving device 102 receives a second signal 112, which indicates a channel. The channel may be indicated by a code included in the second signal 112, wherein the code may correspond to an increment channel command, a decrement channel command, or a command to tune to a specified channel. The content receiving device 102 may obtain the identifier of the channel by demodulating and decoding the second signal 112.

At 208, the content receiving device 102 obtains an identifier of an audiovisual program corresponding to the identifier of the channel obtained at 206. For example, the content receiving device 102 obtains the identifier of the audiovisual program by performing a query EPG data stored by the memory 136 using the identifier of the channel obtained at 206 and the current time. The content receiving device 102 may receive the EPG data via the first network interface 146, for example.

At 210, the content receiving device 102 obtains position information for the remote control device 106. In one or more embodiments, the memory 136 stores instructions that cause the CPU 134 to obtain a distance between the content receiving device 102 and the remote control device 106 based on a power level of a signal 112 received by the content receiving device 102. For example, the memory 136 stores a power level at which the signal 112 is transmitted by the remote control device 106 and a formula that relates power loss to distance. The signal 112 loses power as it travels from the remote control device 106 to the content receiving device 102. The CPU 134 calculates the distance to the remote control device 106 based on how much power of the signal 112 has been lost by the time it is received by the first remote control interface 152.

In one or more embodiments, the memory 136 stores instructions that cause the CPU 134 to obtain the distance between the content receiving device 102 and the remote control device 106 based on a time at which a signal 112 is received by the content receiving device 102. For example, the remote control device 106 includes a clock that is used to set a timestamp in the signal 112 indicating when the signal 112 is transmitted by the remote control device 106. Additionally, the first remote control interface 152 may indicate when the first signal 112 is received. The amount of time that the signal 112 traveled from the remote control device 106 to the content receiving device 102 is equal to the time when the signal 112 was received by the first remote control interface 152 less the time indicated by the timestamp. The memory 136 stores the rate at which the signal 112 travels. The instructions cause the CPU 134 to obtain the distance between the content receiving device 102 and the remote control device 106 by multiplying the rate at which the signal 112 travels and the amount of time the signal 122 travels.

In one or more embodiments, the memory 136 stores instructions that cause the CPU 134 to obtain the distance between the content receiving device 102 and the remote control device 106 based on the phase of a signal transmitted by the remote control device 106. The instructions cause the transmitter 150 to transmit a first signal at a frequency of f Hz. The receiver 126 of the remote control device 106 detects the signal and, in response, the transmitter 124 of the remote control device 106 transmits a second signal at the frequency of f Hz which is phase-locked with the first signal. The content receiving device 102 determines a phase shift $\varphi$ between the first signal and the second signal to determine the distance between the remote control device 106 and the content receiving device 102. The phase shift $\varphi$ depends on the round-trip time from the content receiving device 102 transmitting the first signal until the content receiving device 102 receives the second signal transmitted from the remote control device 106. In one or more embodiments, the content receiving device 102 obtains the distance between it and the remote control device 106 by multiplying the speed of light (i.e., 299,792,458 meters per second) by the phase angle and dividing the result by $4\pi$. The frequency f may be selected based on the desired resolution of the position information, wherein using a higher frequency f results in higher resolution of the position information.

In one or more embodiments, the memory 136 stores instructions that cause the CPU 134 to obtain a direction of the remote control device 106 with respect to the content receiving device 102. For example, the first remote control interface 152 may be located at a predetermined distance from the second remote control interface 154, which is stored by the memory 136. The instructions may cause the CPU 134 to obtain a first distance between the first remote control interface 152 and the remote control device 106, and a second distance between the second remote control interface 154 and the remote control device 106, using one of the techniques described above. The instructions also may cause the CPU 134 to obtain the direction of the remote control device 106 with respect to the content receiving device 102 based on the first distance and the second distance, using conventional geometric techniques.

In one or more embodiments, the memory 136 stores instructions that cause the CPU 134 to obtain coordinates of the remote control device 106. For example, the first remote control interface 152, the second remote control interface 154, and the third remote control interface 156 may be located at respective, predetermined distances from one another, which are stored by the memory 136. The instructions may cause the CPU 134 to obtain a first distance between the first remote control interface 152 and the remote control device 106, a second distance between the second remote control interface 154 and the remote control device 106, a third distance between the third remote control interface 156 and the remote control device 106, using one of the techniques described above. The instructions also may cause the CPU 134 to obtain the coordinates of the remote control device 106 based on the first distance, the second distance, and the third distance, using conventional triangulation techniques.

At 212, the content receiving device 102 associates the identifier of the user obtained at 204 and the identifier of the audiovisual program obtained at 208 with the position information obtained at 210. In one or more embodiments, the memory 136 stores instructions that cause the CPU 134 to store the identifier of the user, the identifier of the audiovisual program, and the position information in a table or other suitable data structure for analyzing viewing habits. For example, the instructions may cause the CPU 134 to associate the position information of the remote control device 106 with the viewing habit information disclosed in U.S. patent application Ser. No. 14/597,540 filed Jan. 15, 2015. The entire contents of U.S. patent application Ser. No. 14/597,540 are incorporated by reference herein. At 214, the method 200 ends.

Figure 5:
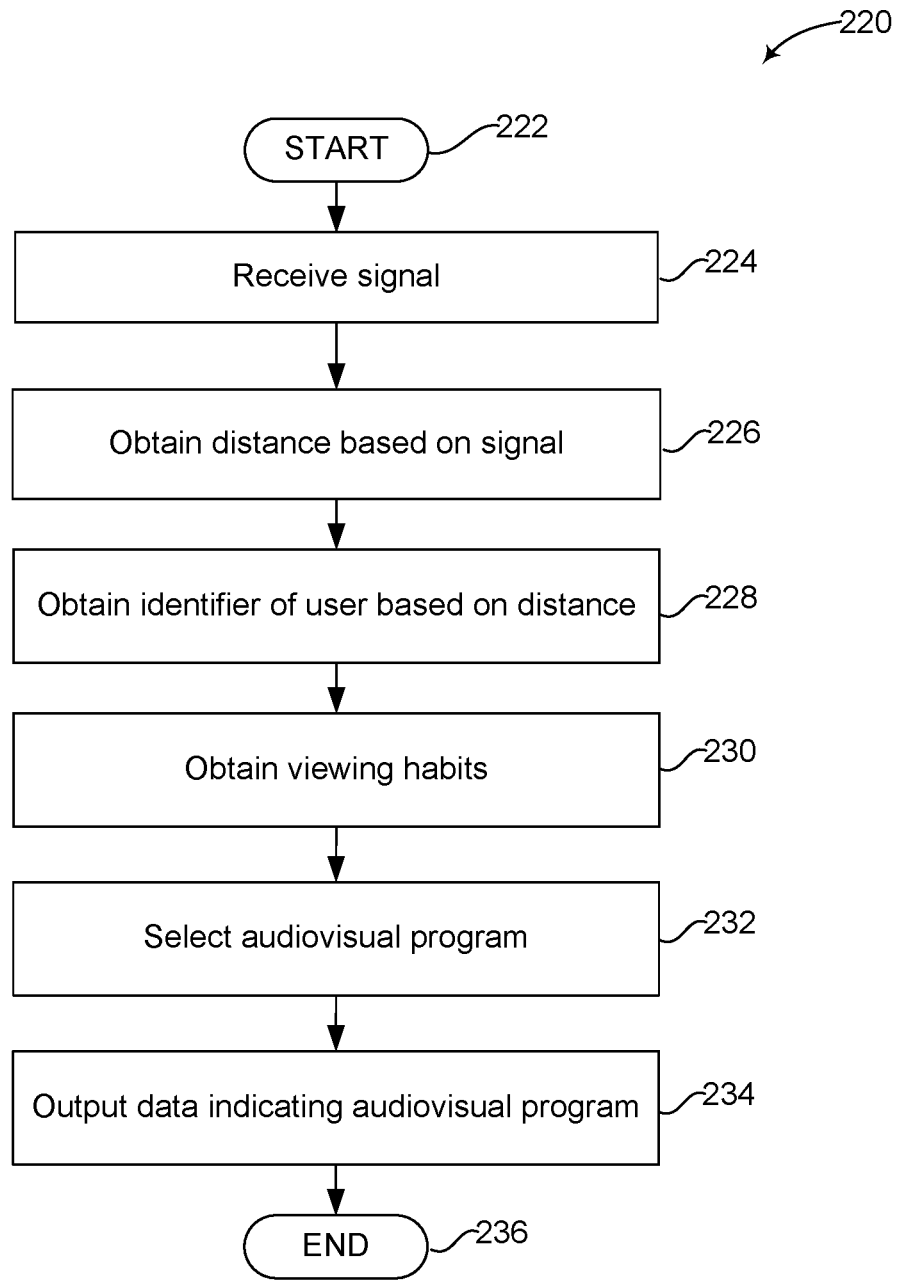
FIG. 5 illustrates a flowchart of a method according to one or more embodiments of the present disclosure.

FIG. 5 illustrates a flowchart of a method 220 according to one or more embodiments of the present disclosure. The method 220 may be performed by an embodiment of the content receiving device 102 that includes the first remote control interface 152, but does not include the second remote control interface 154 and the third remote control interface 156, for example.

At 222, the method 220 begins, for example, when a user pushes a button included in the I/O circuitry 122 of the remote control device 106, which is configured to cause a signal 112 to be transmitted by the remote control device 106. The signal 112 may be an IR signal or an RF signal.

At 224, the first remote control interface 152 of the content receiving device 102 receives the signal 112.

At 226, the content receiving device 102 obtains a distance between the remote control device 106 and the content receiving device 102 based on the signal 112 received at 224. As described above in connection with FIG. 4, the memory 136 of the content receiving device 102 may store instructions that cause the CPU 134 to obtain the distance between the remote control device 106 and the content receiving device 102 based on the power level of the signal 112 when it is received by the first remote control interface 152. Additionally or alternatively, the memory 136 of the content receiving device 102 may store instructions that cause the CPU 134 to obtain the distance between the remote control device 106 and the content receiving device 102 based on the time at which the signal 112 is received by the first remote control interface 152. Additionally or alternatively, the memory 136 of the content receiving device 102 may store instructions that cause the CPU 134 to obtain the distance between the remote control device 106 and the content receiving device 102 based on the phase of the signal 112 received by the first remote control interface 152.

At 228, the content receiving device 102 obtains an identifier of a user. The memory 136 of the content receiving device 102 may store a table or other suitable data structure that associates various identifiers of users and distances. For example, the memory 136 of the content receiving device 102 may store a table that associates an identifier of the first user 108 with a distance of 3 meters, and that associates an identifier of the second user 110 with a distance of 1 meter. If the content receiving device 102 determines at 226 that the distance between the remote control device 106 and the content receiving device 102 is 3 meters, the content receiving device 102 obtains the identifier of the first user 108 at 228. The content receiving device 102 also may determine whether the distance obtained at 226 is within a predefined threshold value of a distance stored in the table. For example, if the predefined threshold value is 10 centimeters and the distance obtained at 226 is 0.9 meters, the content receiving device 102 obtains the identifier of the second user 110 at 228.

At 230, the content receiving device 102 obtains viewing habits that are associated with the identifier of the user obtained at 228. For example, the memory 136 stores instructions that cause the CPU 134 to obtain the viewing habits by querying a database of viewing habits stored in the memory 136 using the identifier of the user obtained at 228.

At 232, the content receiving device 102 selects an audiovisual program based on the viewing habits obtained at 230. FIG. 4 of U.S. patent application Ser. No. 14/597,540 filed Jan. 15, 2015 shows a method of determining an audiovisual program that a user is likely to be interested in viewing based on the user's viewing habits. The memory 136 may store instructions that cause the CPU 134 to select the audiovisual program in the same or a similar manner.

Figure 6:
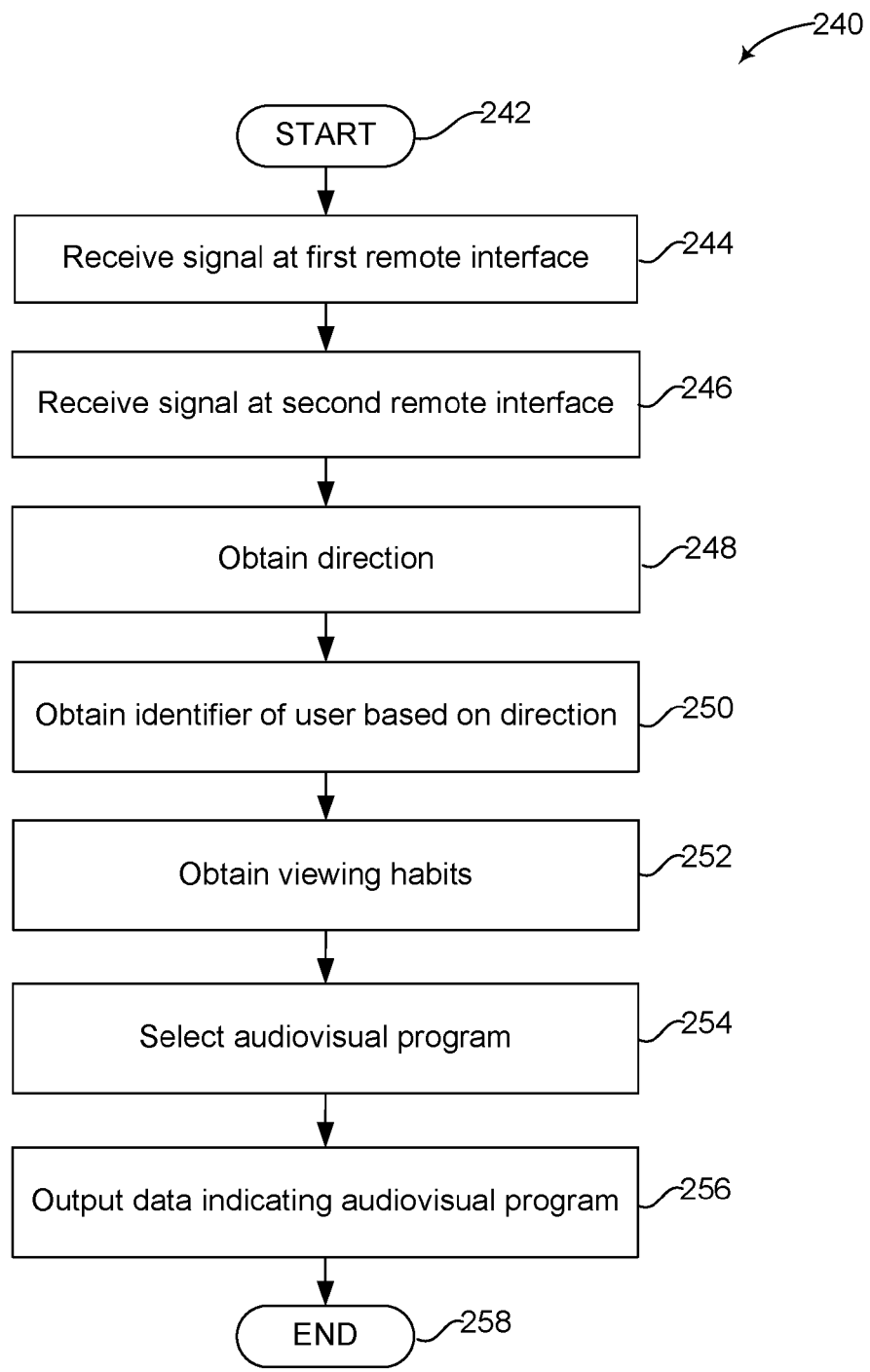
FIG. 6 illustrates a flowchart of a method according to one or more embodiments of the present disclosure.

At 234, the content receiving device 102 outputs data indicating the audiovisual program selected at 232. For example, the content receiving device 102 outputs a signal from the second audiovisual interface 144, which causes the display device 104 to display a home screen customized for a user corresponding to the user identifier obtained at 228, which includes the name or title of the audiovisual program selected at 232. The screen may enable the user to indicate with the remote control device 106 whether the user would like to watch the recommended audiovisual program. If the content receiving device 102 receives a signal from the remote control device 106 indicating that the user would like to watch the audiovisual program, the content receiving device 102 outputs data from the second audiovisual interface 144, which causes the display device 104 to display the audiovisual program. The method 220 ends at 236. FIG. 6 illustrates a flowchart of a method 240 according to one or more embodiments of the present disclosure. The method 240 may be performed by an embodiment of the content receiving device 102 that includes the first remote control interface 152 and the second remote control interface 154, but does not include the third remote control interface 156, for example.

At 242, the method 220 begins, for example, when a user pushes a button included in the I/O circuitry 122 of the remote control device 106, which is configured to cause a signal 112 to be transmitted by the remote control device 106. In one or more embodiments, the signal 112 includes a command to turn on the display device 104. The signal may be an IR signal or an RF signal.

At 244, the first remote control interface 152 of the content receiving device 102 receives the signal 112.

At 246, the second remote control interface 154 of the content receiving device 102 receives the signal 112.

At 248, the content receiving device 102 obtains a direction of the remote control device 106 with respect to the content receiving device 102 based on the signal 112 received at 244 and 246. As described above in connection with FIG. 4, the memory 136 of the content receiving device 102 may store instructions that cause the CPU 134 to obtain the direction of the remote control device 106 with respect to the content receiving device 102 based on the respective power levels of the signal 112 when it is received by the first remote control interface 152 and the second remote control interface 154. Additionally or alternatively, the memory 136 of the content receiving device 102 may store instructions that cause the CPU 134 to obtain the direction of the remote control device 106 with respect to the content receiving device 102 based on the respective times at which the signal 112 is received by the first remote control interface 152 and the second remote control interface 154. Additionally or alternatively, the memory 136 of the content receiving device 102 may store instructions that cause the CPU 134 to obtain the direction of the remote control device 106 with respect to the content receiving device 102 based on the respective phases at which the signal 112 is received by the first remote control interface 152 and the second remote control interface 154.

At 250, the content receiving device 102 obtains an identifier of a user based on the direction of the remote control device 106 obtained at 248. The memory 136 of the content receiving device 102 may store a table or other suitable data structure that associates various identifiers of users and directions. For example, the memory 136 of the content receiving device 102 may store a table that associates an identifier of the first user 108 with a direction of 30 degrees and that associates an identifier of the second user 110 with a direction 135 degrees. If the content receiving device 102 determines at 248 that the direction of the remote control device 106 with respect to the content receiving device 102 is 135 degrees, the content receiving device 102 obtains the identifier of the second user 110 at 250. The content receiving device 102 also may determine whether the direction is within a predefined threshold value of each of the directions stored in the table. For example, if the predefined threshold value is 5 degrees and the direction obtained at 248 is 28 degrees, the content receiving device 102 obtains the identifier of the first user 108 at 250.

At 252, the content receiving device 102 obtains viewing habits that are associated with the identifier of the user obtained at 250. For example, the content receiving device 102 may obtain the viewing habits as described above in connection with FIG. 5.

At 254, the content receiving device 102 selects an audiovisual program based on the viewing habits obtained at 252. For example, the content receiving device 102 may select the audiovisual program as described above in connection with FIG. 5.

At 256, the content receiving device 102 outputs data indicating the audiovisual program selected at 232. For example, the content receiving device 102 may output the data indicating the audiovisual program as described above in connection with FIG. 5.

Figure 7:
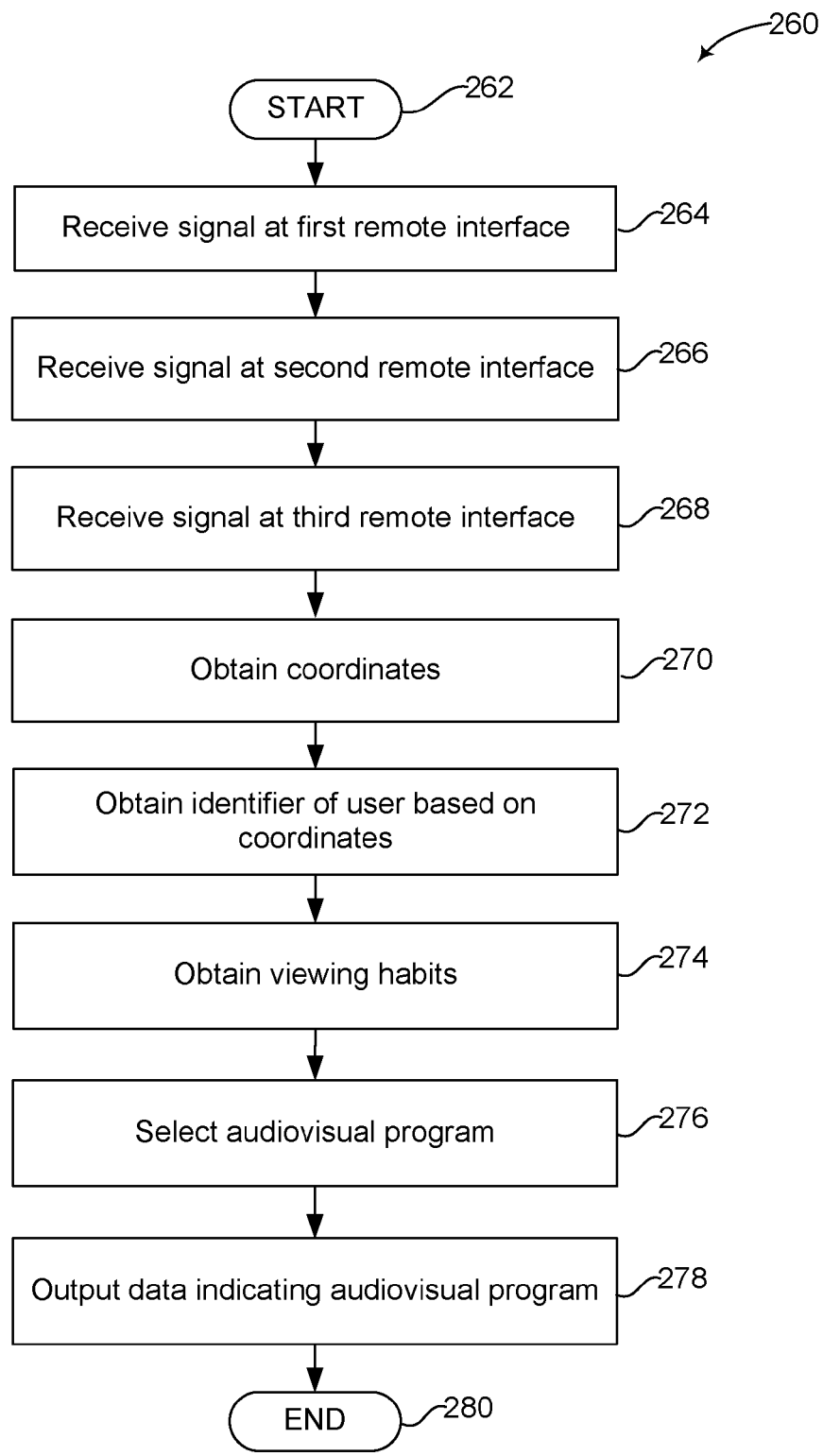
FIG. 7 illustrates a flowchart of a method according to one or more embodiments of the present disclosure.

FIG. 7 illustrates a flowchart of a method 260 according to one or more embodiments of the present disclosure. The method 260 may be performed by an embodiment of the content receiving device 102 that includes the first remote control interface 152, the second remote control interface 154, and the third remote control interface 156, for example.

At 262, the method 220 begins, for example, when a user pushes a button included in the I/O circuitry 122 of the remote control device 106, which is configured to cause a signal 112 to be transmitted by the remote control device 106. In one or more embodiments, the signal 112 includes a command to turn on the display device 104. The signal may be an IR signal or an RF signal.

At 264, the first remote control interface 152 of the content receiving device 102 receives the signal 112.

At 266, the second remote control interface 154 of the content receiving device 102 receives the signal 112.

At 268, the third remote control interface 156 of the content receiving device 102 receives the signal 112.

At 270, the content receiving device 102 obtains coordinates of the remote control device 106 based on the signal 112 being received at 264, 266, and 268. As described above in connection with FIG. 4, the memory 136 of the content receiving device 102 may store instructions that cause the CPU 134 to obtain the coordinates of the remote control device 106 based on the respective power levels of the signal 112 when it is received by the first remote control interface 152, the second remote control interface 154, and the third remote control interface 156. Additionally or alternatively, the memory 136 of the content receiving device 102 may store instructions that cause the CPU 134 to obtain the coordinates of the remote control device 106 based on the respective times at which the signal 112 is received by the first remote control interface 152, the second remote control interface 154, and the third remote control interface 156. Additionally or alternatively, the memory 136 of the content receiving device 102 may store instructions that cause the CPU 134 to obtain the coordinates of the remote control device 106 based on the respective phases at which the signal 112 is received by the first remote control interface 152, the second remote control interface 154, and the third remote control interface 156.

At 272, the content receiving device 102 obtains an identifier of a user based on the coordinates obtained at 270. The memory 136 of the content receiving device 102 may store a table or other suitable data structure that associates various identifiers of users and sets of coordinates. For example, the memory 136 of the content receiving device 102 may store a table that associates an identifier of the first user 108 with the set of coordinates (2, 2), and that associates an identifier of the second user 110 with the set of coordinates (−1, 1). If the content receiving device 102 determines at 270 that the coordinates of the remote control device 106 are (2, 2), the content receiving device 102 obtains the identifier of the first user 108 at 272. The content receiving device 102 also may determine whether the coordinates obtained at 270 are within predefined threshold values of each of the sets of coordinates stored in the table. For example, if each of the predefined threshold values is 10 centimeters and the coordinates obtained at 270 are (−0.9, 1.1), the content receiving device 102 obtains the identifier of the second user 110 at 272.

At 274, the content receiving device 102 obtains viewing habits that are associated with the identifier of the user obtained at 272. For example, the content receiving device 102 may obtain the viewing habits as described above in connection with FIG. 5.

At 276, the content receiving device 102 selects an audiovisual program based on the viewing habits obtained at 274. For example, the content receiving device 102 may select the audiovisual program as described above in connection with FIG. 5.

At 278, the content receiving device 102 outputs data indicating the audiovisual program selected at 232. For example, the content receiving device 102 may output the data indicating the audiovisual program as described above in connection with FIG. 5. The method 260 ends at 280.

Figure 8:
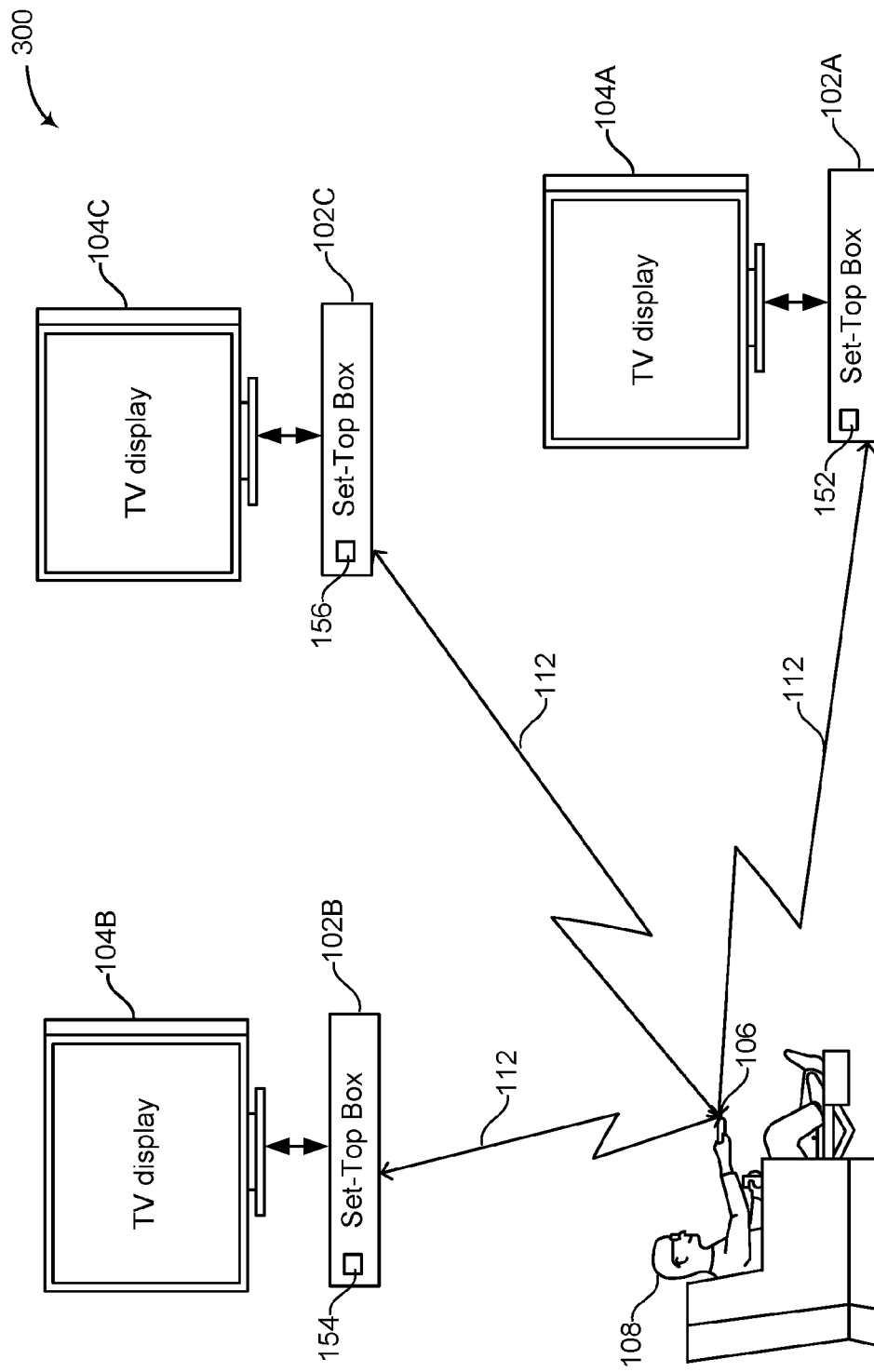
FIG. 8 illustrates a system according to one or more embodiments of the present disclosure.

FIG. 8 illustrates a system 300 according to one or more embodiments of the present disclosure. The system 300 includes a first content receiving device 102A, a second content receiving device 102B, and a third content receiving device 102C. For example, the first content receiving device 102A may be an embodiment of the content receiving device 102 that includes the first remote control interface 152, but does not include the second remote control interface 154 and the third remote control interface 156; the second content receiving device 102B may be an embodiment of the content receiving device 102 that includes the second remote control interface 154, but does not include the first remote control interface 152 and the third remote control interface 156; and the third content receiving device 102C may be an embodiment of the content receiving device 102 that includes the third remote control interface 156, but does not include the first remote control interface 152 and the second remote control interface 154.

In one or more embodiments, the content receiving devices 102A is configured differently than the content receiving devices 102B and 102C. For example, the content receiving devices 102B and 102C do not include the audiovisual interface 140 and the network interface 146; instead, they receive audiovisual content from the content receiving device 102A via the network interface 148. The system 300 also includes a first display device 104A, a second display device 104B, and a third display device 104C, which are respectively coupled to the content receiving devices 102A-102C.

By way of example, the first content receiving device 102A may be located in the same room as the first user 108. The second content receiving device 102B may be located in a room that is next to the room in which the first user 108 is located. The third content receiving device 102C may be located in a room that is on a different floor than the room in which the first user 108 is located. When the first user 108 operates the remote control device 106, the remote control device 106 transmits a signal 112 that is received by each of the content receiving devices 102A-102C.

Figure 9:
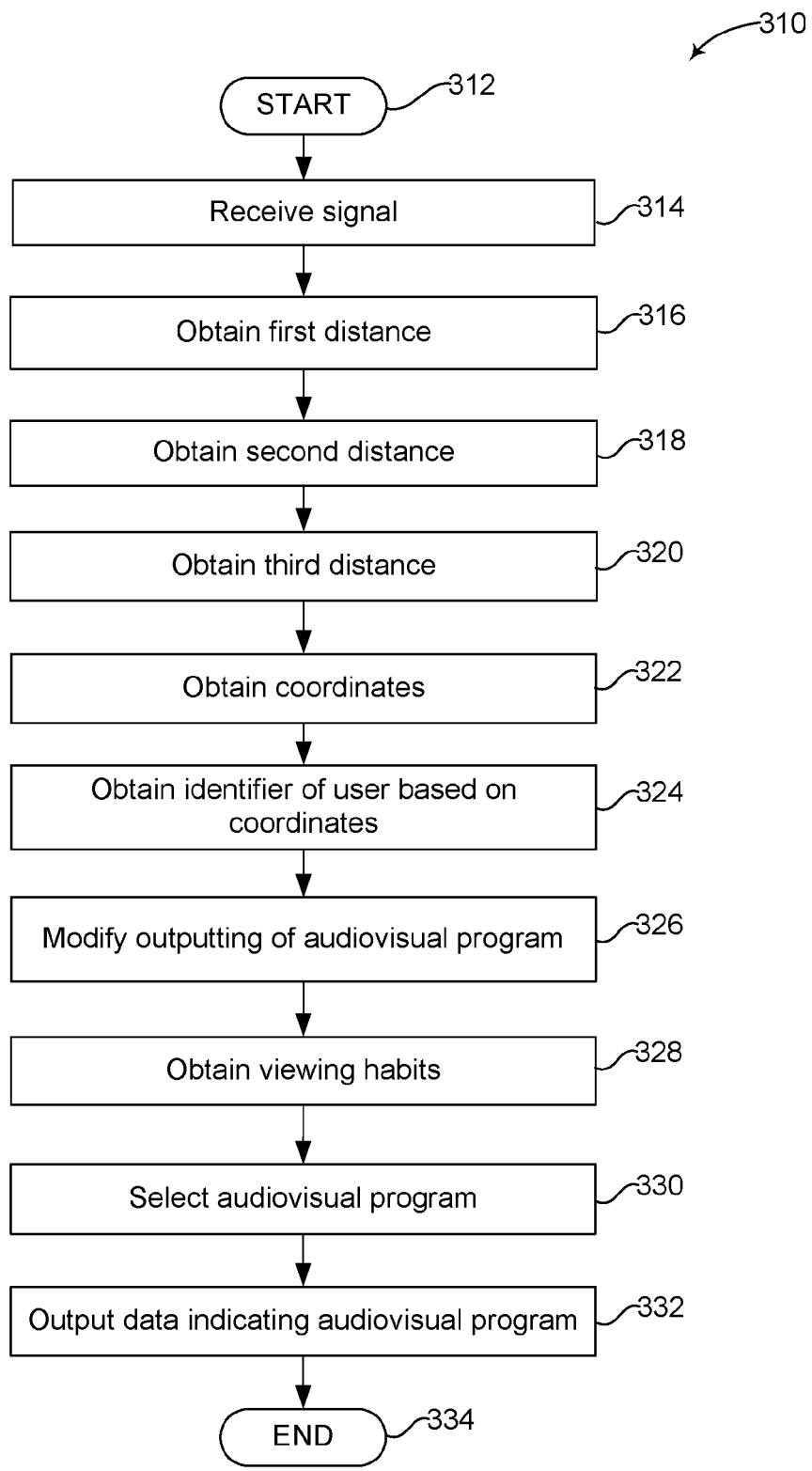
FIG. 9 illustrates a flowchart of a method according to one or more embodiments of the present disclosure.

FIG. 9 illustrates a flowchart of a method 310 according to one or more embodiments of the present disclosure. The method 310 may be performed by the first content receiving device 102A shown in FIG. 8. The method 310 begins at 312, for example, when the first user 108 pushes a button included in the I/O circuitry 122 of the remote control device 106, which is configured to cause a first signal 112 to be transmitted by the remote control device 106.

At 314, the first remote control interface 152 of the first content receiving device 102A receives the first signal 112.

At 316, the first content receiving device 102A obtains a first distance, which is a distance between the remote control device 106 and the first content receiving device 102A. For example, the first content receiving device 102A may obtain the distance between the remote control device 106 and the first content receiving device 102A in a manner described above in connection with FIG. 4.

At 318, the first content receiving device 102A obtains a second distance, which is a distance between the remote control device 106 and the second content receiving device 102B.

For example, the second content receiving device 102B may have received the first signal 112 transmitted by the remote control device 106, determined the second distance between the remote control device 106 and the second content receiving device 102B, and transmitted to the first content receiving device 102A a second signal indicating the second distance. The first content receiving device 102A may receive the second signal via the second network interface 148 and obtain the second distance from the second signal by demodulating and decoding the second signal. In one or more embodiments, the first content receiving device 102A sends a signal to the second content receiving device 102B via the second network interface 148 to request that the second content receiving device 102B transmit the second signal indicating the second distance to the first content receiving device 102A.

At 320, the first content receiving device 102A obtains a third distance, which is a distance between the remote control device 106 and the third content receiving device 102C.

For example, the third content receiving device 102C may have received the first signal 112 transmitted by the remote control device 106, determined the third distance between the remote control device 106 and the third content receiving device 102C, and transmitted to the first content receiving device 102A a third signal indicating the third distance. The first content receiving device 102A may receive the third signal via the second network interface 148 and obtain the third distance from the third signal by demodulating and decoding the third signal. In one or more embodiments, the first content receiving device 102A sends a signal to the third content receiving device 102C via the second network interface 148 to request that the third content receiving device 102C transmit the third signal indicating the third distance to the first content receiving device 102A.

At 322, the first content receiving device 102A obtains coordinates of the remote control device 106 based on the first, second, and third distances. For example, the first content receiving device 102A, second content receiving device 102B, and the third content receiving device 102C may be located at predetermined distances from one another, which are stored by the memory 136 of the first content receiving device 102A. In one or more embodiments, each of the second content receiving device 102B and the third content receiving device 102C transmits to the first content receiving device 102A a signal that includes coordinates indicating its location. The memory 136 of the first content receiving device 102 may store instructions that cause the CPU 134 to obtain the coordinates of the remote control device 106 based on the first distance, the second distance, and the third distance, using conventional triangulation techniques.

At 324, the first content receiving device 102A obtains an identifier of a user based on the coordinates obtained at 322. For example, the first content receiving device 102A may obtain the identifier of the user as described above in connection with FIG. 7.

At 326, the first content receiving device 102A modifies outputting of an audiovisual program presented on the display device 104A.

In one or more embodiments, the memory 136 of the first content receiving device 102A stores instructions that cause the CPU 134 to obtain an audio level based on the coordinates obtained at 322. For example, the memory 136 of the first content receiving device 102A may store a table or other suitable data structure that associates a plurality of distances and a plurality of respective audio levels. Also, the instructions may cause the CPU 134 to select the audio level associated with the distance that most closely matches the distance between the content receiving device 102A and the first user 108, and cause an audio encoder included in the processing circuitry 142 to set the audio level of an audiovisual program that is output to the display device 104A to the selected audio level. Alternatively, the memory 136 of the first content receiving device 102A may store a preferred audio level in association with the identifier of the user obtained at 324, and the instructions may cause the CPU 134 to cause an audio encoder included in the processing circuitry 142 to set the audio level of an audiovisual program that is output to the display device 104A to the preferred audio level.

In one or more embodiments, the memory 136 of the first content receiving device 102A stores instructions that cause the CPU 134 to obtain a brightness level based on the coordinates obtained at 322. For example, the memory 136 of the first content receiving device 102A may store a table or other suitable data structure that associates a plurality of distances and a plurality of respective brightness levels. Also, the instructions may cause the CPU 134 to select the brightness level associated with the distance that most closely matches the distance between the content receiving device 102A and the first user 108, and cause a video encoder included in the processing circuitry 142 to set the brightness level of an audiovisual program that is output to the display device 104A to the selected brightness level. Alternatively, the memory 136 of the first content receiving device 102A may store a preferred brightness level in association with the identifier of the user obtained at 324, and the instructions may cause the CPU 134 to cause an audio encoder included in the processing circuitry 142 to set the audio level of an audiovisual program that is output to the display device 104A to the preferred brightness level.

At 328, the first content receiving device 102A obtains viewing habits that are associated with the identifier of the user obtained at 324. For example, the first content receiving device 102A may obtain the viewing habits as described above in connection with FIG. 5.

At 330, the first content receiving device 102A selects an audiovisual program based on the viewing habits obtained at 328. For example, the first content receiving device 102A may select the audiovisual program as described above in connection with FIG. 5.

At 332, the first content receiving device 102A outputs data indicating the audiovisual program selected at 228. For example, the content receiving device 102 may output the data indicating the audiovisual program as described above in connection with FIG. 5. The method 310 ends at 334.

The various embodiments described above can be combined to provide further embodiments. For example, the method illustrated in FIG. 6 has been described as being performed by the content receiving devices 102 based on, among other things, the signal 112 received by the second remote control interface 154 at 246. However, in one or more embodiments, the method illustrated in FIG. 6 is performed by the first content receiving device 102A based on, among other things, information received by the network interface 148 at 246. For example, instead of the second remote control interface 154 receiving the signal 112 at 246, the network interface 148 receives a signal from the second content receiving device 102B at 246, which is used along with the signal 112 received at 244 to obtain the direction of the remote control device 106 at 250. Additionally, the method illustrated in FIG. 9 has been described as being performed the first content receiving device 102A based on, among other things, the network interface 148 receiving the first and the second distances at 316 and 318, respectively. However, in one or more embodiments, the method illustrated in FIG. 9 is performed by the content receiver 102 based on, among other things, first and the second distances obtained from receiving the signal 112 at the second remote control interface 154 and the third remote control interface 156 at 316 and 318, respectively. Numerous other similar modifications to the disclosed embodiments are within the scope of the present disclosure.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a display device;
    a first content receiving device, the first content receiving device including:
        a first remote control interface configured to receive a first signal transmitted by a remote control device;
        at least one first processor coupled to the first remote control interface;
        a first memory device coupled to the at least one first processor, the first memory device storing processor-executable instructions that, when executed by the at least one first processor, cause the first content receiving device to obtain a first distance between the remote control device and the first content receiving device; and
        a first network interface configured to transmit a second signal indicating the obtained first distance between the remote control device and the first content receiving device; and
    a second content receiving device, the second content receiving device including:

a second remote control interface configured to receive the first signal transmitted by the remote control device;
a second network interface configured to receive the second signal transmitted by the first content receiving device;
at least one second processor coupled to the second remote control interface and the second network interface;
a second memory device coupled to the at least one second processor, the second memory device storing processor-executable instructions that, when executed by the at least one second processor, cause the second content receiving device to:
obtain a second distance between the remote control device and the second content receiving device; and
modify outputting of an audiovisual program presented on the display device based on the first distance and the second distance.

2. The system of claim 1, wherein the instructions, when executed by the at least one second processor, cause the second content receiving device to modify an audio level of the audiovisual program presented on the display device based on the first distance and the second distance.

3. The system of claim 1, wherein the instructions, when executed by the at least one second processor, cause the second content receiving device to modify a brightness level of the audiovisual program presented on the display device based on the first distance and the second distance.

4. The system of claim 1, wherein the instructions, when executed by the at least one second processor, cause the second content receiving device to:
obtain viewing habits based on the first distance and the second distance;
select at least one audiovisual program based on the obtained viewing habits; and
output data indicating the selected at least one audiovisual program.

5. The system of claim 1 wherein the second memory device stores processor-executable instructions that, when executed by the at least one second processor, cause the second content receiving device to obtain a direction of the remote control device with respect to the second content receiving device based on the first distance and the second distance.

6. The system of claim 1, further comprising:
a third content receiving device, the third content receiving device including:
a third remote control interface configured to receive the first signal transmitted by the remote control device;
at least one third first processor coupled to the third remote control interface;
a third memory device coupled to the at least one third first processor, the third memory device storing processor-executable instructions that, when executed by the at least one third processor, cause the third content receiving device to obtain a third distance between the remote control device and the third content receiving device; and
a third network interface configured to transmit a third signal indicating the obtained first distance between the remote control device and the third content receiving device,
wherein the second network interface is configured to receive the third signal transmitted by the third content receiving device, and
wherein the second memory device stores processor-executable instructions that, when executed by the at least one second processor, cause the second content receiving device to obtain a plurality of coordinates of the remote control device based on the first distance, the second distance, and the third distance.

7. The system of claim 6 wherein the second memory device stores processor-executable instructions that, when executed by the at least one second processor, cause the second content receiving device to:
obtain viewing habits based on the plurality of coordinates of the remote control device;
select at least one audiovisual program based on the obtained viewing habits; and
output data indicating the selected at least one audiovisual program.

8. The system of claim 6 wherein the second memory device stores information indicating a location of the first content receiving device and a location of the third content receiving device.

9. A method, comprising:
receiving, at a first content receiving device, a first signal transmitted by a remote control device;
obtaining a distance between the remote control device and the first content receiving device based on the signal transmitted by the remote control device;
obtaining viewing habits based on the obtained distance between the remote control device and the first content receiving device;
selecting at least one audiovisual program based on the obtained viewing habits; and
outputting data indicating the selected at least one audiovisual program.

10. The method of claim 9 wherein the signal includes at least one command for controlling a display device.

11. The method of claim 9, further comprising:
modifying outputting of an audiovisual program based on the obtained distance between the remote control device and the first content receiving device.

12. The method of claim 9, further comprising:
receiving, at the first content receiving device, a second signal transmitted from a second content receiving device indicating a distance between the remote control and the second content receiving device; and
obtaining a direction of the remote control device with respect to the first content receiving device based on the first signal and the second signal,
wherein obtaining viewing habits includes obtaining viewing habits based on the obtained direction of the remote control device with respect to the first content receiving device.

13. The method of claim 9, further comprising:
receiving, at the first content receiving device, a second signal transmitted from a second content receiving device indicating a distance between the remote control and the second content receiving device; and
receiving, at the first content receiving device, a third signal transmitted from a third content receiving device indicating a distance between the remote control and the third content receiving device; and
obtaining a plurality of coordinates of the remote control device based on the first signal, the second signal, and the third signal, wherein obtaining viewing habits includes obtaining viewing habits based on the obtained plurality of coordinates of the remote control device.

14. The method of claim 9, further comprising:
obtaining an identifier of a user based on the obtained distance between the remote control device and the first content receiving device,
wherein obtaining viewing habits includes obtaining viewing habits based on the obtained identifier of the user.

15. The method of claim 9 wherein:
receiving the first signal transmitted by the remote control device includes receiving, at a plurality of content receiving devices, the first signal transmitted by the remote control device,
obtaining the distance between the remote control device and the first content receiving device includes determining a plurality of distances between the remote control device and the first content receiving device based on the receiving of the first signal at the plurality of content receiving devices, and
obtaining viewing habits includes obtaining viewing habits based on the obtained plurality of distances between the remote control device and the first content receiving device.

16. A first content receiving device, comprising:
a first remote control interface configured to receive a first signal transmitted by a remote control device;
at least one processor coupled to the first remote control interface; and
a memory device coupled to the at least one processor, the memory device storing processor-executable instructions that, when executed by the at least one processor, cause the first content receiving device to:
obtain a distance between the remote control device and the first content receiving device based on the first signal;
obtain viewing habits based on the obtained distance between the remote control device and the first content receiving device;
select at least one audiovisual program based on the obtained viewing habits; and
output data indicating the selected at least one audiovisual program.

17. The first content receiving device of claim 16, further comprising:
a second remote control interface configured to receive the first signal transmitted by the remote control device,
wherein the instructions, when executed by the at least one processor, cause the first content receiving device to obtain a direction of the remote control device with respect to the first content receiving device based on reception of the first signal by the first remote control interface and the second remote control interface, and
wherein the instructions, when executed by the at least one processor, cause the first content receiving device to obtain the viewing habits based on the obtained direction of the remote control device with respect to the first content receiving device.

18. The first content receiving device of claim 16, further comprising:
a second remote control interface configured to receive the first signal transmitted by the remote control device,
a third remote control interface configured to receive the first signal transmitted from by remote control device,
wherein the instructions, when executed by the at least one processor, cause the first content receiving device to obtain a plurality of coordinates of the remote control device based reception of the first signal by the first remote control interface, the second remote control interface, and the third remote control interface, and
wherein the instructions, when executed by the at least one processor, cause the first content receiving device to obtain the viewing habits based on the obtained plurality of coordinates of the remote control device.

19. The first content receiving device of claim 16, further comprising:
a network interface configured to receive a second signal transmitted by a second content receiving device indicating a distance between the second content receiving device and the remote control device,
wherein the instructions, when executed by the at least one processor, cause the first content receiving device to obtain a direction of the remote control device with respect to the first content receiving device based on the first signal and the second signal, and
wherein the instructions, when executed by the at least one processor, cause the first content receiving device to obtain the viewing habits based on the obtained direction of the remote control device with respect to the first content receiving device.

20. The first content receiving device of claim 16, further comprising:
a network interface configured to receive a second signal transmitted by a second content receiving device indicating a distance between the second content receiving device and the remote control device, and to receive a third signal transmitted by a third content receiving device indicating a distance between the third content receiving device and the remote control device,
wherein the instructions, when executed by the at least one processor, cause the first content receiving device to obtain a plurality of coordinates of the remote control device based on the first signal, the second signal, and the third signal, and
wherein the instructions, when executed by the at least one processor, cause the first content receiving device to obtain the viewing habits based on the obtained plurality of coordinates of the remote control device.

* * * * *